United States Patent [19]
Weirich

[11] Patent Number: 5,953,000
[45] Date of Patent: Sep. 14, 1999

[54] BOUNDED-DISPLAY-SURFACE SYSTEM FOR THE INPUT AND OUTPUT OF COMPUTER DATA AND VIDEO GRAPHICS

[76] Inventor: John P. Weirich, 2236 Fuller Ct., #209 B, Ann Arbor, Mich. 48105

[21] Appl. No.: 08/867,434

[22] Filed: Jun. 2, 1997

[51] Int. Cl.⁶ .................................................. G09G 5/00
[52] U.S. Cl. .................................. 345/173; 345/7; 345/8; 345/9; 345/158; 345/177
[58] Field of Search .................................. 345/173, 174, 345/179, 7, 8, 9, 156, 158, 177

[56] References Cited

U.S. PATENT DOCUMENTS

| | | |
|---|---|---|
| 3,983,474 | 9/1976 | Kuipers . |
| 4,054,881 | 10/1977 | Raab . |
| 4,159,417 | 6/1979 | Rubincam ................................. 235/375 |
| 4,298,874 | 11/1981 | Kuipers . |
| 4,314,251 | 2/1982 | Raab . |
| 4,346,384 | 8/1982 | Raab . |
| 4,550,984 | 11/1985 | Reymond ..................................... 345/7 |
| 4,589,659 | 5/1986 | Yokoi et al. .............................. 463/34 |
| 4,852,988 | 8/1989 | Velez et al. . |
| 4,855,725 | 8/1989 | Fernandez ................................. 345/173 |
| 5,049,862 | 9/1991 | Dao et al. ................................. 345/179 |
| 5,237,651 | 8/1993 | Randall ..................................... 345/350 |
| 5,367,315 | 11/1994 | Pan ........................................... 345/158 |
| 5,394,517 | 2/1995 | Kalawsky ................................. 345/429 |
| 5,422,653 | 6/1995 | Maguire, Jr. . |
| 5,463,725 | 10/1995 | Henckel et al. .......................... 345/350 |
| 5,483,250 | 1/1996 | Herrick ..................................... 345/32 |
| 5,491,510 | 2/1996 | Gove ......................................... 345/9 |
| 5,583,526 | 12/1996 | Socks et al. ................................ 345/7 |
| 5,590,062 | 12/1996 | Nagamitsu et al. ........................ 345/8 |
| 5,615,132 | 3/1997 | Horton et al. . |
| 5,717,414 | 2/1998 | Bergsneider et al. ................... 345/158 |
| 5,748,182 | 5/1998 | Ohashi et al. ........................... 345/177 |

*Primary Examiner*—Daniel J. Wu
*Assistant Examiner*—John Tweel, Jr.

[57] ABSTRACT

A virtual reality visual display system comprises a display device viewable by a user and a remote bounded-display-surface and stylus for entering data and graphics. The display device and remote bounded-display-surface each are equipped with sources of energy and communicate therebetween with radio or microwave radiation. The remote bounded-display-surface location and orientation in space is continuously transmitted to the display device whereby the virtual image of the bounded-display-surface is generated in the display device in mimicry of the actual surface. Application of the stylus to the bounded-display-surface causes the stylus tip location in space to likewise be transmitted to the display device and displayed as a virtual image. Thus, the bounded-display-surface can be "written-on" with the stylus regardless of orientation and a virtual representation complete with proper orientation displayed in real time on the display device.

20 Claims, 6 Drawing Sheets

BOUNDED-DISPLAY-SURFACE SYSTEM FOR THE INPUT AND OUTPUT OF COMPUTER DATA AND VIDEO GRAPHICS

BACKGROUND OF THE INVENTION

1. Field of the Invention

The present invention relates to visual display input-output devices for head-mounted computer video system displays.

2. Description of the Relevant Art

Virtual reality can be described as a set of images, and sometimes sounds, that are generated by a computer and broadcast directly to a person who perceives them as an encompassing "reality". Often the apparatus used to broadcast the images to the person is a helmet shaped device worn over the head. This device often contains two small screens, one for each eye, a speaker for each ear, and some devices to track head movements. This is a large and heavy device that cannot be worn constantly during everyday activities.

Since these initial helmet like devices were introduced, more compact virtual reality appliances have been constructed or described. These would be devices such as: smaller lighter goggle or eyeglass sized devices which hold liquid crystal displays (LCD) over the eyes; eyeglass like devices equipped with LCDs and mirroring systems to display images on the lens part of the glasses; eyeglass like devices equipped with laser and mirroring systems that draw images directly on the retina of the eye thereby creating the illusion that the drawn image is floating in space directly ahead of the viewer; and others.

Computers are commonly used throughout the world and can have many different characteristics depending on their use. One type of computer is termed the "personal digital assistant" in the popular and trade press. This type of computer is typically portable and battery powered. An example of this type of computer is the Newton computer sold by Apple Computer Corporation.

A "personal digital assistant" type computer usually has a large LCD area for displaying output to the user. Very often this LCD area is also used as an input area to allow the user to issue commands and enter hand written information by touching and moving a stylus on this surface. The LCD display area contains electronic sensors that can track the location of the stylus tip and thereby sense its movements over the surface. Typically, as the stylus tip is moved across the LCD surface, a line is instantaneously displayed by the LCD which illuminates the exact path followed by the stylus.

SUMMARY OF THE INVENTION

For any number of reasons it could be useful for a wearer of a head-mounted display system—such as those referred to above—to use a particular area of the field of view as if it were a wall display, note pad or open book type of object. Further, it could be useful for the wearer of such a virtual reality device to be able to manipulate the physical position of this same display object while viewing it, as if it were in fact a wall display or notebook or open book, respectively. It is therefore an object of this invention to provide a device that physically exists and acts as a display surface for computer generated images and also captures and transmits information concerning strokes on its surface to a computer.

According to this invention, the bounded-display-surface system defines an actual physical area in space that is known by a computer. The computer is used in conjunction with a head-mounted display device to generate a graphic image on the head-mounted display which overlays that particular defined area in space. This allows the user of the head-mounted display to view particular information within a bounded area in actual space while further enabling the user to physically move that bounded area at will. Additionally, the user can move a stylus over the surface of the present invention. The stylus movement is detected by a computer which then causes the path of stylus movement to be displayed on the head-mounted display overlaying the bounded-display-surface as if the line were actually being drawn on the surface itself.

For illustrative purposes, the bounded-display-surface apparatus includes a flat surface about the size of a book. It could be any color or size or shape including curved surfaces. This surface includes electric circuitry that allows the detection of a stylus that is pressed against it and the location of that contact on the surface area. This could be accomplished by a pressure pad type of device or by recognizing electrical properties of the stylus.

The bounded-display-surface apparatus also includes electromagnetic wave transmitters around its periphery. These could be time-of-flight radio frequency transmitters or time-of-arrival microwave transmitters or other types. Time-of-flight and time-of-arrival transmitters are available from Lawrence Livermore National Laboratory. These transmitters emit pulses that are detected by receivers embedded in the frame of the head-mounted display. These signals are processed by the computer which uses triangulation to determine the exact location and attitude in space of the bounded-display-surface. The computer then uses this locational information to generate the graphics for the precise area in the head-mounted display that corresponds to this calculated location in space. A frequency control tuner may be included to adjust frequencies to eliminate any interference with the transmissions.

The bounded-display-surface apparatus also includes a radio transmitter to enable a "writing on the surface" feature. When a user places the stylus on the touch pad surface of the bounded-display-surface apparatus, the radio within the apparatus instantaneously transmits the location of the stylus to a receiver which is connected to the computer. Thus, the computer knows that the stylus is touching the bounded-display-surface at a particular location. The computer then takes action based on its programming.

One action the computer could take is to illuminate the pixel in the head-mounted display that corresponds exactly, in the field of view of the wearer, to the point in space where the stylus touches the bounded-display-surface. Thus, the wearer would perceive that the display surface is being written on as the stylus moves across the surface and subsequent corresponding pixels are illuminated on the head-mounted display. This is how perception of "writing" or "drawing" on the surface of the bounded-display-surface apparatus is accomplished.

The bounded-display-surface system includes electromagnetic wave receivers in the frames of the head-mounted display. These receivers gather wave pulses from the transmitters placed around the periphery of the bounded-display-surface apparatus for the purpose described above. These receivers can be located anywhere so long as it is known precisely what their location is relative to the location of the eye displays in the head-mounted device. This enables calculation of the exact location and attitude of the bounded-display-surface and corresponding pixel locations on the eye displays. Further, the frames of the head-mounted display could hold sensors that enable detection of the exact location of the wearer's eyes relative to the frames themselves. This would allow the picture generated on the LCDs of the head-mounted display to be adjusted as the frames moved about. This would be useful, for example, if the head-mounted display were an eyeglass type device that slips down the wearer's nose.

The form of the bounded-display-surface of the present invention can be of any shape and size. One form is that of a book like object. In this instance, there would be two bounded-display-surfaces connected with a hinged spine. The area on each side of the book would be a distinct bounded area and different images would be generated for each side, thus creating for the user, the perception of a real book. Another form of the invention is that of a note pad. Here one surface is available for viewing and writing. It could be lain on a desk like a pad of paper. Yet another variation is that of a picture hanging on a wall. Here there would be one surface that is actually hung on the wall. The computer would then display a picture as the user stood in front of the display surface to view it.

There are many combinations of equipment that are possible with the bounded-display-surface system. One embodiment would have a computer with an integral radio receiver connected by wire to the head-mounted display. The computer would receive information from the bounded-display-surface apparatus by radio signals. Another embodiment would be to include the computer unit with an integral radio transmitter within the bounded-display-surface apparatus itself, and send information to a radio receiver equipped head-mounted display device by radio signals. Another embodiment would be to equip the bounded-display-surface apparatus with a radio transmitter and a CD ROM or PCMCIA or other mass storage device. This would allow stored information to be transmitted to the receiver equipped computer, and then be displayed by the head-mounted device as usual. Another embodiment would have several "pages" equipped with periphery transmitters included between the back and front of the book like embodiment and attached to the spine. This would allow "paging" through the book, similar to a regular book. These "pages" could be equipped for "writing" with the stylus. Synaptics, Inc. provides touch pad technology that is both flexible and responsive to finger touch. Thus, "writing" and other signalling could also be performed by finger touching. There are many other variations regarding equipment combinations.

There are many alternative systems to describe the present invention that would be readily apparent to those skilled in the art. Therefore, the specific embodiment disclosed is not to be understood as limiting in any respect and is only used as a way to illustrate the invention. The invention will be more easily understood by reference to the detailed description and drawings.

DETAILED DESCRIPTION

The following text describes several possible embodiments of the present invention. These descriptions are intended to be merely illustrative of the invention and should not be understood as limiting in any way.

Figure 1A:
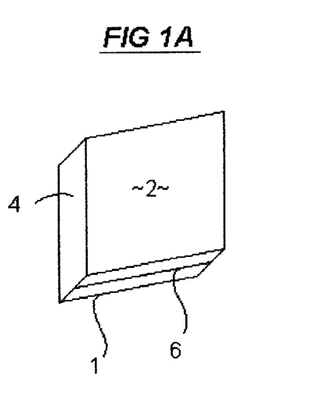
FIG. 1A shows a perspective view of the bounded-display-surface in a closed book like embodiment.

FIG. 1A shows a perspective view of the invention embodied in the shape of a book like object when the book is in the closed position. The top 2 of the book is attached to a hinged spine piece 4 which is attached to the bottom part 1 of the book. The meeting joint of the top 2 and bottom part 1 is shown at 6.

Figure 1B:
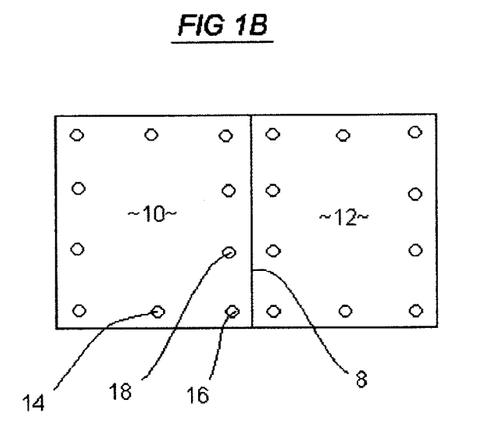
FIG. 1B shows a top view of the book like embodiment when opened flat.

FIG. 1B shows the view of the book like embodiment in the open position. Here the left inside over 10 is joined to the right inside cover 12 by the hinged spine 8. The objects illustrated at 14 and 16 and 18 are transmitters. These transmitters can broadcast electromagnetic waves at radiowave or microwave frequencies. Note that transmitters like 14 are located completely around the periphery of the left hand side 10 and right hand side 12 of this open book embodiment.

Figure 2:
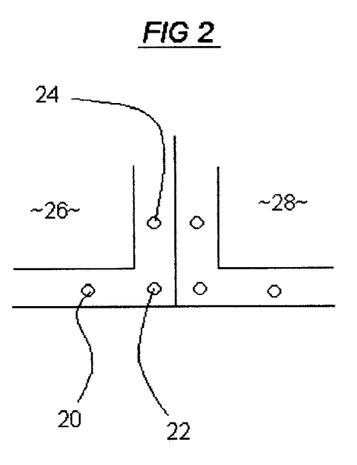
FIG. 2 shows details of the lower right hand corner of the left hand side of the opened book embodiment.

FIG. 2 shows a close up view of the lower right hand corner of the left hand side 26 of the book. Three of the periphery transmitters 20 and 22 and 24 are shown. A partial view of the right hand side 28 with several transmitters is also shown.

Figure 3:
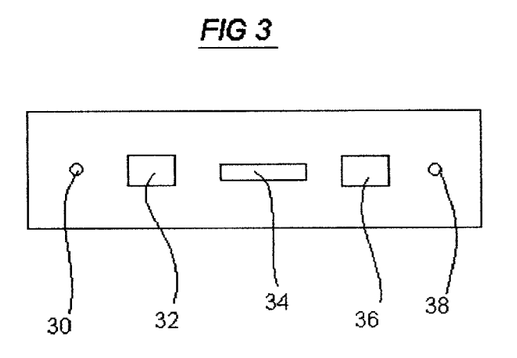
FIG. 3 shows details of the lower edge of the right hand side of the book embodiment.

FIG. 3 shows the lower edge of the bottom of the book 58. This illustrates various devices that could be included within the structure of the book according to the features desired. A socket for a power cord 30 is shown. To the right of this the cover hatch for a battery pack 32 is shown. A CD-ROM or PCMCIA storage device is indicated at 34. A port 36 for connection to other computers or peripherals is shown. And a frequency control knob 38 is provided. The knob 38 allows the user to adjust the frequency used by the transmitters to eliminate any interference that may occur at a particular frequency.

Figure 4:
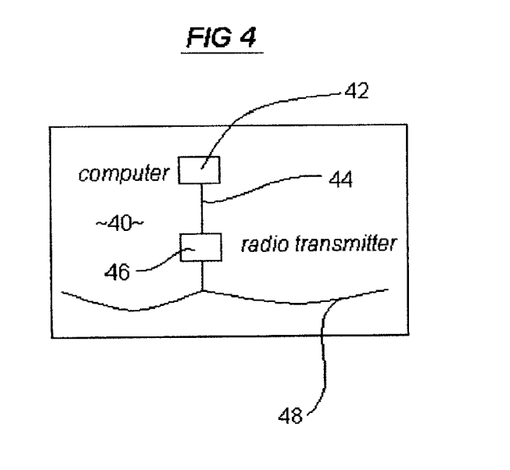
FIG. 4 shows a diagram of the computer components that are included in an embodiment of the invention.

FIG. 4 illustrates some devices that can be included within the structure of the book embodiment according to desires. Here the right hand side of the book 40 contains a computer 42, a radio transmitter 46 and an antenna 48. The computer 42 is attached to the radio 46 through wire 44, but the radio 46 could also be built integral with the computer. The purpose of these devices is to enable the book embodiment of the present invention to do all data processing therewithin, then transmit instructions to the head-mounted display in FIG. 8A below using the radio transmitter 46.

Figure 5:
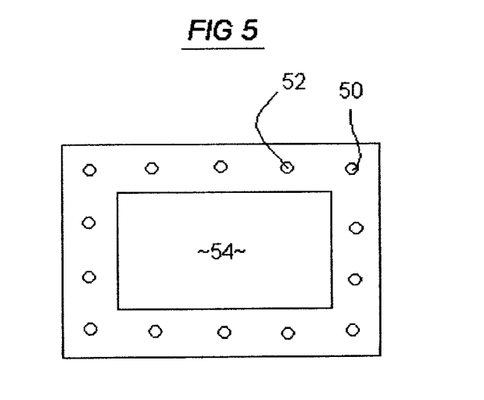
FIG. 5 shows a top view of a note pad like embodiment of the invention.

FIG. 5 shows a note pad or plain flat surface embodiment of the present invention. Here the bounded surface 54 is a single undivided area. This area 54 is rimmed by transmitters such as 50 and 52 completely around its periphery.

Figure 6:
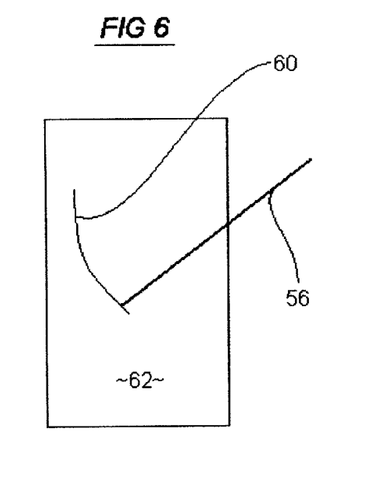
FIG. 6 shows a diagram of a stylus "writing" on the surface of the invention.

FIG. 6 shows a stylus 56 moving across the surface 62 of the present invention with a line 60 being displayed which follows the path taken by the stylus 56.

Figure 7A:
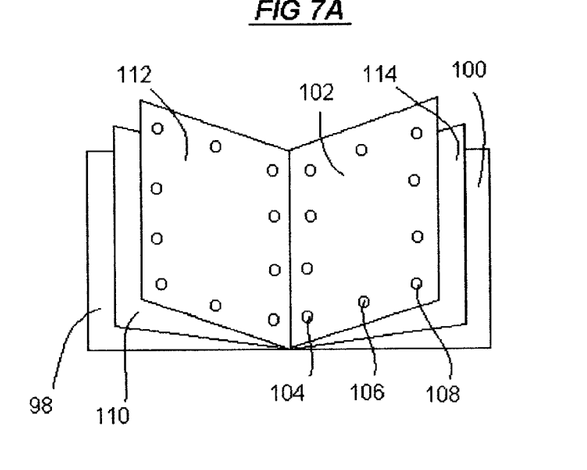
FIG. 7A shows a perspective view of the open book with pages embodiment of the invention.

FIG. 7A shows the open book with pages embodiment of the present invention. The left hand side cover 98 and right hand side cover 100 are shown laying flat open. There are four pages in this book 110, 112, 102 and 114. Page 102 illustrates transmitters distributed around its periphery like those at 104, 106 and 108. Page 112 also illustrates transmitters around its periphery. These pages 110, 112, 102 and 114 can be flexible or stiff and have integral touch pad technology.

Figure 7B:
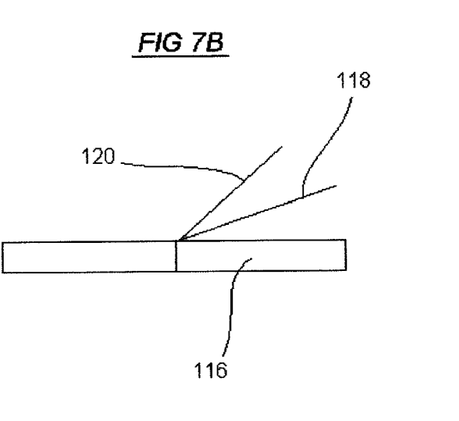
FIG. 7B shows an end view of the open book with pages embodiment.

FIG. 7B shows the open book with pages embodiment from the edge perspective. The right hand side cover 116 is shown laying flat, with pages 118 and 120 above it.

Figure 8A:
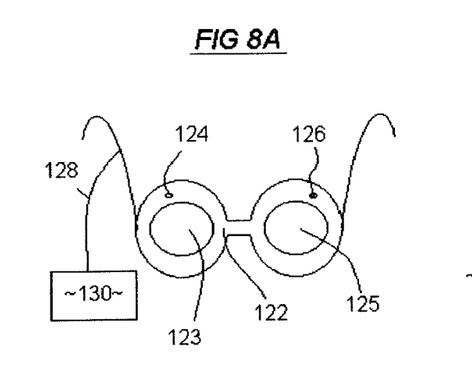
FIG. 8A shows a front view of the head-mounted display device with receivers.

FIG. 8A shows head-mounted display glasses 122. Two microwave or radiowave receivers 124 and 126 are incorporated into the frames of the glasses 122. The head-mounted display glasses are connected to a computer 130 through cable 128. The computer drives the displays 123 and 125 in the glasses 122 and processes the data passed to it by the receivers 124 and 126.

Figure 8B:
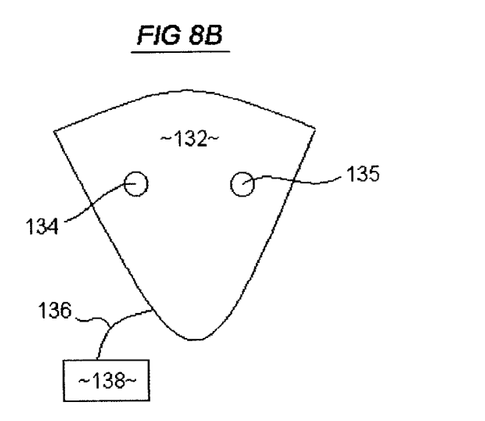
FIG. 8B shows a front view of a wearable badge with receiver.

FIG. 8B shows a wearable badge 132 that holds receivers 134 and 135 for radiowaves or microwaves. The receivers 134 and 135 are connected to a computer 138 by cable 136.

Figure 9:
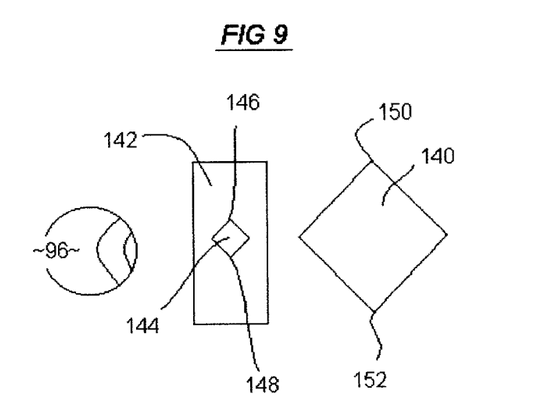
FIG. 9 shows a side view of a user's viewpoint.

FIG. 9 schematically shows the relationship between the user's eye 96 and a liquid crystal display (LCD) 142 that could be the display means used in a head-mounted display apparatus and the bounded display surface of the present invention 140.

Figure 10:
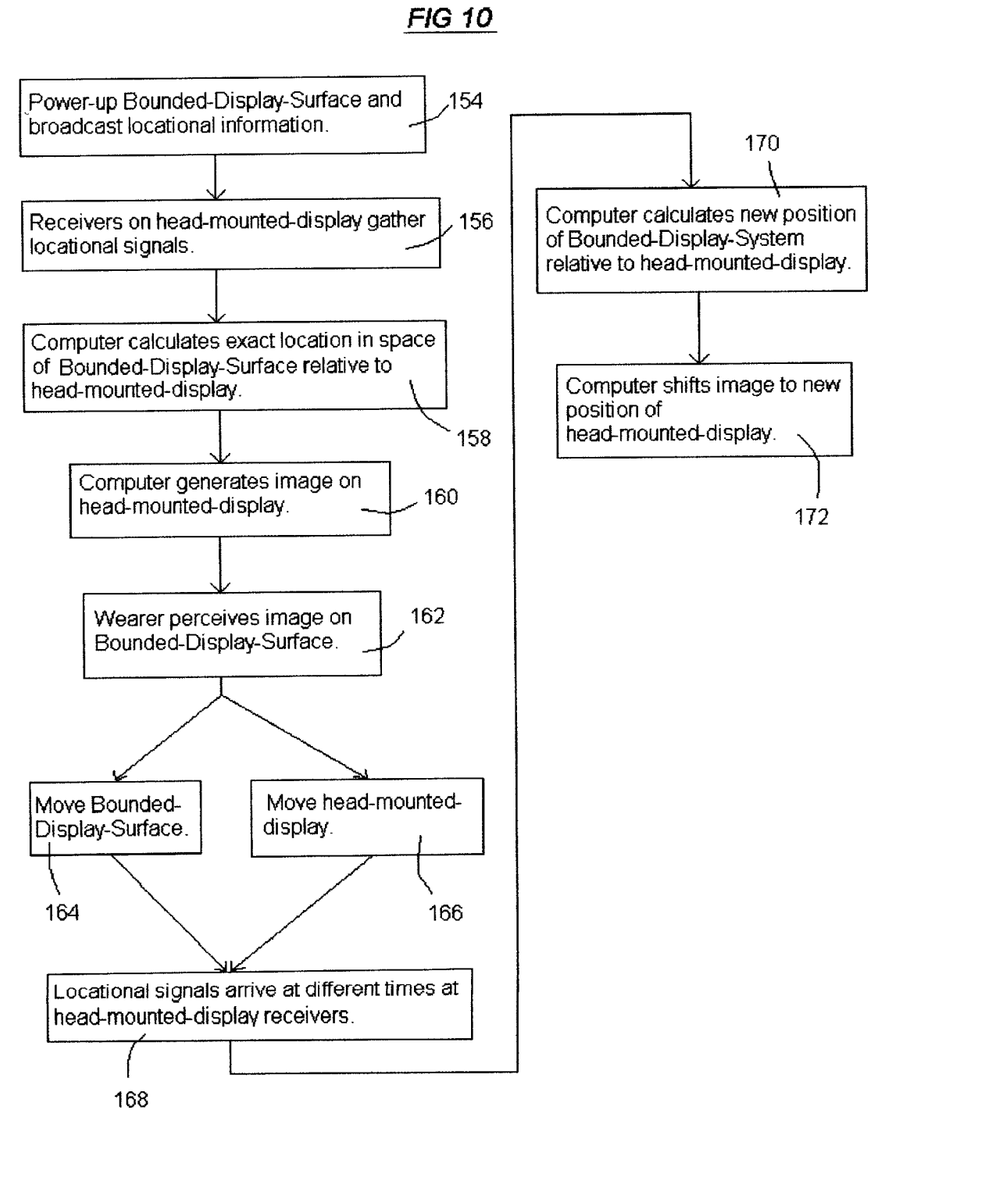
FIG. 10 is a flow chart of the operation of the invention.

FIG. 10 shows the actions and reactions in the operation of the bounded-display-surface system in a step-by-step progression. It outlines a sequence of events from powering-up the system 154 to shifting images on the head-mounted display 172.

Figure 11:
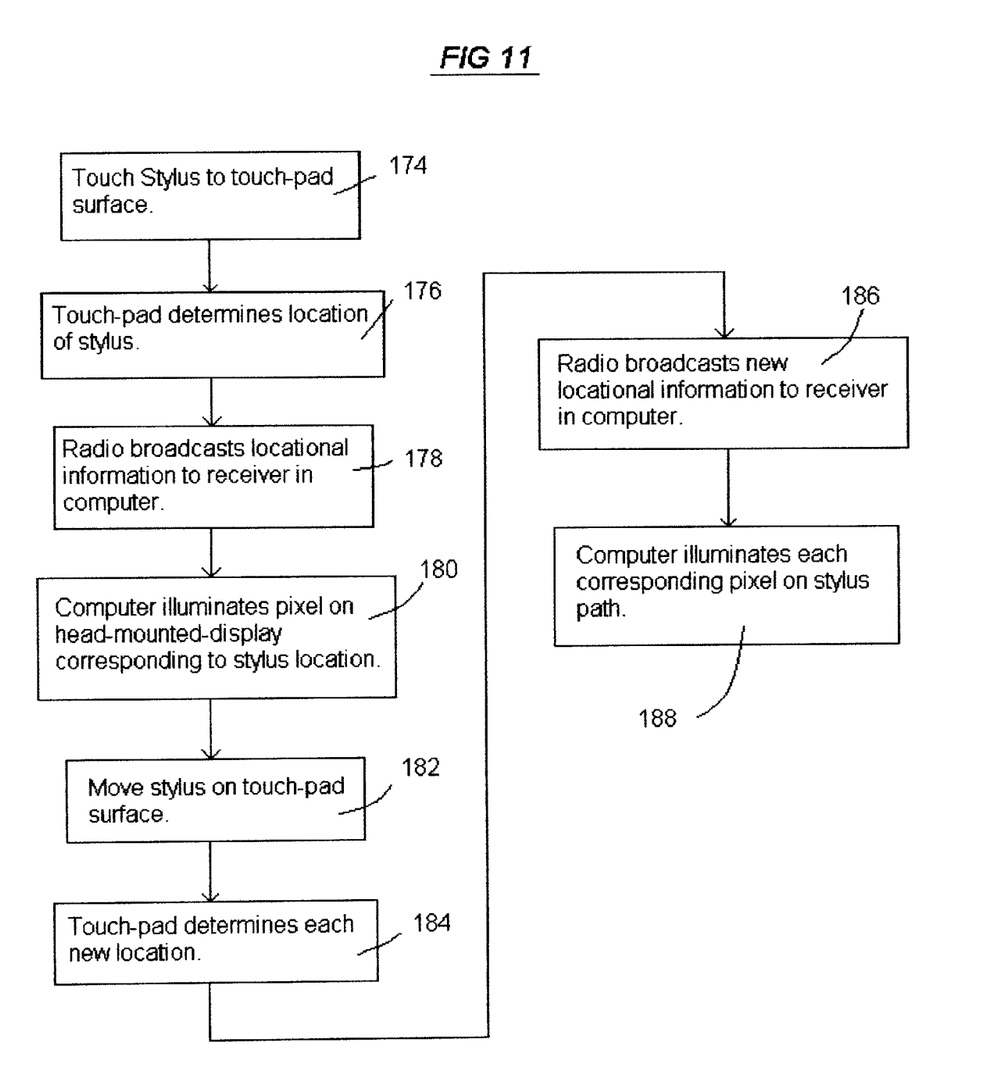
FIG. 11 is a flow chart representation of writing on the invention.

FIG. 11 describes a progression of events that occur when using a stylus to write on the bounded-display-surface.

Figure 12:
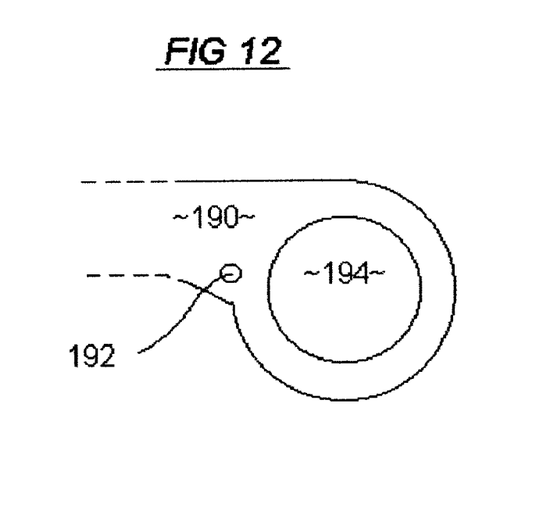
FIG. 12 shows a back view of the right half of an eyeglass head-mounted display.

FIG. 12 shows the back view of the right hand side 190 of an eyeglass type of head-mounted display. A sub-miniature electronic camera 192 is shown embedded into the frame of the eyeglasses near the nose holding portion of the frame. Such sub-miniature cameras are available from VLSI Vision Ltd. in England. The camera 192 is used to transmit an image of the corner of the eye of the wearer to the computer. The computer uses this information to determine the location of the eye relative to the visual displays 194 in the head-mounted display.

Figure 13:
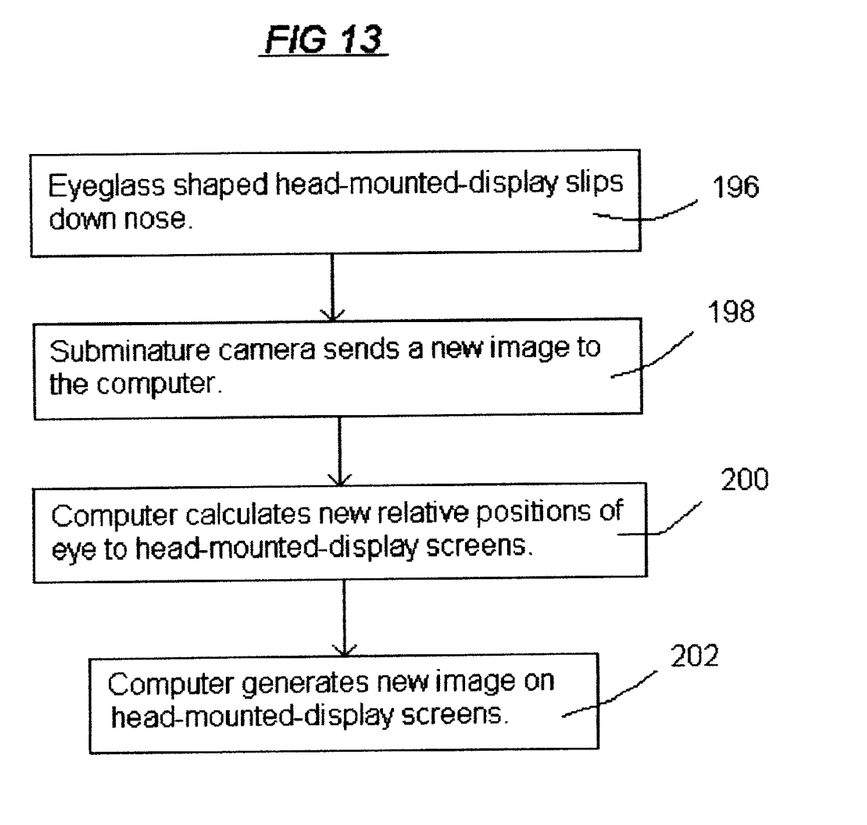
FIG. 13 is a flow chart representation of the adjustment of scenes depicted on a head-mounted display.

FIG. 13 shows the progression of steps involved in adjusting the images displayed on the head-mounted display apparatus 190 in FIG. 12 if that apparatus slips down the nose of the wearer.

A scenario for use of the book embodiment of the present invention may proceed as follows. The user picks up the closed book embodiment FIG. 1A and opens it up FIG. 1B and lays it on a desk. The act of opening the book embodiment automatically powers-up the invention by activating an internal power switch. The user then places and positions the head-mounted display glasses FIG. 8A so the displays are positioned properly before his eyes. The glasses are turned on and are communicating with the computer which drives the graphics displays in the glasses.

With these devices powered up and correctly positioned, it is possible for the devices to begin communicating with each other and to respond to user activities. First, the transmitters 14, 16 and 18 in FIG. 1B begin to transmit pulses of radiowaves to the receivers 124 and 126 as shown in FIG. 8A located in the head-mounted display. The receivers communicate with the computer 130 of FIG. 8A that signals have been received by them at this exact time. The computer is able to precisely determine the time that the signals were detected by the receivers. Then using the information the computer calculates the exact position of the book embodiment by using triangulation mathematical techniques.

Having calculated the exact position of the bounded display areas 10 and 12 shown in FIG. 1B, in space, the computer then calculates the exact areas on the LCD displays 123 and 125 of the head-mounted display FIG. 8A that correspond to the bounded-display-surface areas. The computer then generates graphic images in these precise areas on the LCDs that exhibit the content desired. By this means the user perceives that the bounded-display-surfaces 10 and 12 in FIG. 1B actually have some content written on them, when in fact they do not. It is an illusion, that is, virtual reality.

Now suppose the user lifts the book embodiment off the desk and puts it in his lap. Upon each little movement of the book the transmitters 14, 16 and 18 in FIG. 1B located around the peripheries of the display areas 10 and 12 send radiowave pulses to the receivers 124 and 126 in the head-mounted display FIG. 8A. Each time these pulses are received the computer 42 is sent messages of their arrival. The computer 42 then recalculates the exact location in space of the bounded-display-surfaces 10 and 12 in FIG. 1B and their corresponding areas on the LCD displays 123 and 125 in FIG. 8A positioned before the eyes of the user. All this is done substantially instantaneously. The graphics on the LCDs are then redrawn continuously to reflect the moving position of the book embodiment in space.

Now suppose the user picks up a stylus 56 as shown in FIG. 6 and places it against the bounded-display-surface 62 and begins to write some letters. Here the touch pad surface 62 of the present invention detects the pressure and movement of the stylus 56. At the initial touch of the stylus to the surface, the radio transmitter 46 in FIG. 4 within the embodiment transmits the location of the stylus tip on the touch pad surface to the computer 130 in FIG. 8A which is equipped with a receiver for this purpose. The computer uses this information regarding the location of the stylus tip on the touch pad in combination with the information it has regarding the location of the bounded-display-surface in space. The computer 130 can then calculate the exact pixel locations on the LCD displays 123 and 125 in the head-mounted display in FIG. 8A that correspond to the location of the stylus tip on the touch pad surface 62 in FIG. 6 and illuminate these pixels. The user perceives this as a point he has just written on the surface of the pad. Again it is an illusion.

When the user moves the stylus 56 across the touch pad surface 62 in FIG. 6 to form a letter, the touch pad perceives these movements and relays this locational information to the computer 130 in FIG. 8A using the radio transmitter. The computer 130 uses this information regarding new locations of the stylus tip on the pad to generate corresponding graphics on the LCDs 123 and 125 in FIG. 8A following these movements. In this manner any writing or other drawings are seen by the user to be created on the bounded-display-surface of the present invention.

FIG. 7A shows the bounded-display-surface in the shape of an open book which includes pages. Here a user could lay the book embodiment on a desk and page through it as he would a conventional book. Each page 110, 112, 102 and 114 of the book contains transmitters 104, 106 and 108 around its periphery, like those 14, 16 and 18 described above in FIG. 1B. It is possible, using any of several different methods, to distinguish the emissions of the transmitters on one page from those on different pages. For example, the transmissions from page 112 could be broadcast at frequency X, while those from page 102 could be broadcast at frequency Y. Another alternative is that transmissions from page 110 could occur only during time interval T1 while those from page 114 could occur only at time interval T2. This would enable the computer to distinguish the signals from each separate page and thereby use this information to determine the exact location of each separate page in space.

FIG. 9 illustrates the correspondence of the bounded-display-surface 140 to a graphic image 144 that is generated on an LCD 142 of a head-mounted display apparatus. The user's eye 154 views the computer generated image 144 of the bounded-display-surface 140. As shown, corner point 146 of the LCD image corresponds to corner point 150 of the bounded-display-surface, likewise corner point 148 corresponds to corner point 152. This situation applies to any corresponding points between the LCD image and the bounded-display-surface.

Referring to FIG. 10, a flow chart of events is shown relating to the operation of the present invention. First, the bounded-display-surface apparatus is powered-up 154, which causes the transmitters to begin broadcasting their locations. Second, the receivers in the head-mounted display device gather the locational signals 156 from the transmitters. Third, the computer calculates the exact location in space of the bounded-display-surface relative to the location of the head-mounted display 158. Fourth, the computer displays an image on the head-mounted display that covers the area in the field of view of the wearer, which corresponds to the location of the bounded-display-surface in space, relative to the location of the wearer's eyes 160. This causes the user to perceive the image just described 160 as if it were in fact an actual image on the bounded-display-surface 162.

Now assume that the user either moves the position of the bounded-display-surface in space 164, or moves the head-mounted display 166 by moving his head, for example, or both. In this situation these events would follow. Immediately the locational signals would begin arriving at the receivers on the head-mounted display at a different time 168 due to the shift in distances. The computer would use this information to calculate a new position in space for the bounded-display-surface apparatus relative to the head-mounted display 170. The computer would then generate a new image on the head-mounted display reflecting the new position of the bounded-display-surface 172.

FIG. 11 shows the procession of events for writing on the bounded-display-surface. First, the stylus is placed on the surface of the touch pad surface 174. The touch pad "realizes" that the stylus has been placed upon it and determines the exact location of contact 176. The radio 178, integral with the bounded-display-surface apparatus, broadcasts the locational information to the receiver integral with the computer 130 in FIG. 8A which drives the head-mounted display. The computer then calculates the location on the head-mounted display which corresponds exactly, in the field-of-view of the wearer, to the location in space where the stylus contacts the touch pad 180. The computer then illuminates the pixel that occupies this location on the head-mounted display.

Now say the stylus is moved across the surface of the touch pad 182. The touch pad recognizes each new location of the contact point 184 as the stylus moves. The radio broadcasts the locational information 186 to the radio receiver integral with the computer. The computer then calculates the corresponding location on the head-mounted display and illuminates that pixel 188. Thus, as the stylus sweeps across the touch pad, each corresponding pixel is illuminated on the head-mounted display substantially instantaneously with the movement of the stylus, thereby creating the appearance of actually writing on the surface of the bounded-display-surface apparatus.

Another feature of the present invention, is its ability to adjust the scene presented on the head-mounted display, as the frames of the head-mounted display shift relative to the position of the wearer's eyes. For example, assume that the bounded-display-surface apparatus remains motionless in space. Further assume the user's head remains steady. Then, if the eyeglasses slip down the nose, the scene displayed in the eyeglasses must be shifted up in compensation, in order for the scene to remain at a constant location relative to the wearer's eyes. This is the reason for the sub-miniature camera 192 in FIG. 12.

The camera 192, is embedded in the frame 190 of the head-mounted display at a point that provides a clear picture of the corner of the eye. Such a point could be where the frames ride the bridge of the nose. The camera 192 feeds its picture of the eye to the computer 130 in FIG. 8A. The computer 130, is programmed to recognize the eye and determine its location relative to the displays 194 in FIG. 12 of the eyeglasses. For example, the computer could recognize the eye by using edge-finding and pattern-recognition algorithms. As the frames slipped down the nose, the computer would immediately "know" that the location of the eye had risen relative to the frames and instantaneously adjust the picture in the displays 194 upward to compensate. Thus, the image generated on the eyeglasses would continuously overlay the area of the bounded-display-surface rather than sink below it as the frames shifted down the nose.

It is understood that the above description of the preferred embodiment is merely illustrative and not limiting in any sense. The scope of the claimed invention is better defined with reference to the following claims.

I claim:

1. A visual display apparatus comprising viewable display means placeable on the head of a user and a bounded-display-surface remote from the viewable display means, said viewable display means comprising at least one display screen directly viewable by the user, means in electrical communication with the display means to energize and control the display means and electromagnetic wave receiving means in electrical communication with the means to energize and control the display means, and said bounded-display-surfacecomprising at least one surface moveable in three dimensional space and having at least two boundaries, at least three locations each positioned at known distances from the at least two boundaries of the bounded-display-surface, electromagnetic wave transmitter means attached to the bounded-display-surface and adapted to transmit the spacial positions of the at least three locations relative to the electro-magnetic wave receiving means, and computer means in electrical communication with the electro-magnetic wave receiving means and means to energize and control the display means whereby the bounded-display-surface is virtually rendered on the display screen.

2. The visual display apparatus of claim 1 wherein the bounded-display-surface comprises two surfaces rotatably movable relative to each other between closed and open positions.

3. The visual display apparatus of claim 2 including a fourth location positioned at a known distance from at least one boundary of one of the two surfaces.

4. The visual display apparatus of claim 1 wherein the bounded-display-surface comprises a plurality of surfaces rotatably moveable relative to each other among closed and open positions with each of the plurality of surfaces having at least one location positioned at a known distance from at least one boundary of the surface.

5. The visual display apparatus of claim 1 including a user operable stylus having a "writing" tip and means adjacent the bounded-display-surface to sense the instantaneous position of the stylus tip on the bounded-display-surface.

6. The visual display apparatus of claim 1 including second computer means in electrical communication with electro-magnetic wave transmitter means attached to the bounded-display-surface.

7. The visual display apparatus of claim 1 wherein the electro-magnetic wave transmitter means comprises a plurality of transmitters spaced about the periphery of the bounded-display-surface.

8. The visual display apparatus of claim 7 wherein the bounded-display-surface comprises a plurality of surfaces rotatably movable relative to each other among closed and open positions with the plurality of transmitters spaced about the periphery of at least two of the surfaces.

9. The visual display apparatus of claim 1 wherein the viewable display means comprise a plurality of display screens and the means to energize and control the display means and the electro-magnetic wave receiving means are mounted adjacent the viewable display means.

10. The visual display apparatus of claim 1 wherein the means to energize and control the viewable display means and the electro-magnetic wave receiving means are spaced from the viewable display means and connected thereto by an electrical cable.

11. The visual display apparatus of claim 10 including second computer means in electrical communication with electro-magnetic wave transmitter means attached to the bounded-display-surface.

12. A method of displaying a sequence of virtual visual images comprising the steps of:

broadcasting locational information from a bounded-display-surface, receiving the locational information at receiving means spaced from the bounded-display-surface, computing a position in space of the bounded-display-surface relative to a viewable display means, generating an image of the bounded-display-surface on viewable display means, in response to a change in position in space of the bounded-display-surface relative to the viewable display means, recalculating the position in space of the bounded-display-surface relative to the viewable display means, and regenerating the image of the bounded-display-surface on the viewable display means.

13. The method of claim 12 comprising the additional steps of:

contacting a stylus tip to the bounded-display-surface, determining the location of the stylus tip on the bounded-display-surface, broadcasting the location of the stylus tip to the receiving means, computing a position in space of the stylus tip relative to the viewable display means, generating at least one pixel image of the stylus tip on the viewable display means, moving the stylus tip and, in response thereto, recomputing the position in space of the stylus tip relative to the viewable display means from the broadcast location received by the receiving means, and generating a changed pixel image of the stylus tip on the viewable display means.

14. The method of claim 13 including the step of retaining a plurality of previously generated pixel images of the stylus tip on the viewable display means.

15. The method of claim 12 comprising the additional steps of:

sensing a change in spacial distance of a viewer's eye relative to the viewable display means, computing a new relative position of the eye to the viewable display means, and generating an image on the viewable display means revised in response to the newly computed relative position of the eye to the viewable display means.

16. A bounded display surface comprising at least one surface moveable in three dimensional space and having at least two boundaries, at least three locations each positioned at known distances from the at least two boundaries of the bounded-display-surface, electro-magnetic wave transmitter means attached to the bounded-display-surface and adapted to transmit the spacial positions of the at least three locations relative to an electro-magnetic wave receiving means, and viewable display means located remotely from the bounded-display-surface, said electro-magnetic wave receiving means in communication with the viewable display means whereby the bounded-display-surface is virtually rendered to a user on the viewable display means, the viewable display means being placeable on the head of the user.

17. The bounded-display-surface of claim 16 wherein the bounded-display-surface comprises a plurality of surfaces rotatably moveable relative to each other among closed and open positions with each of the plurality of surfaces having at least one location positioned at a known distance from at least one boundary of the surface.

18. The bounded-display-surface of claim 16 including a user operable stylus having a "writing" tip and means adjacent the bounded-display-surface to sense the instantaneous position of the stylus tip on the bounded-display-surface.

19. The bounded-display-surface of claim 16 including a sub-miniature camera placeable on the head of the user and mounted to move with movement of the viewable display means, said sub-miniature camera positioned to view at least one eye of the user.

20. The visual display apparatus of claim 1 including a sub-miniature camera placeable on the head of the user and mounted to move with movement of the viewable display means, said sub-miniature camera positioned to view at least one eye of the user.

* * * * *